F. M. ROSS.
RESILIENT WHEEL.
APPLICATION FILED JAN. 15, 1912.
1,057,092.
Patented Mar. 25, 1913.
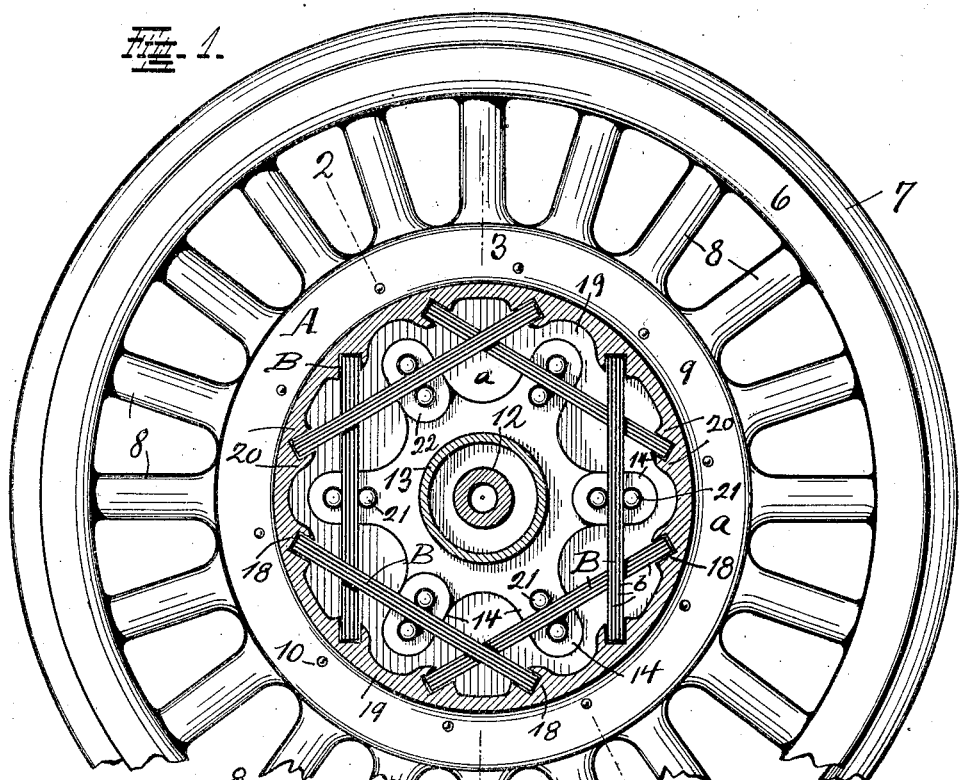
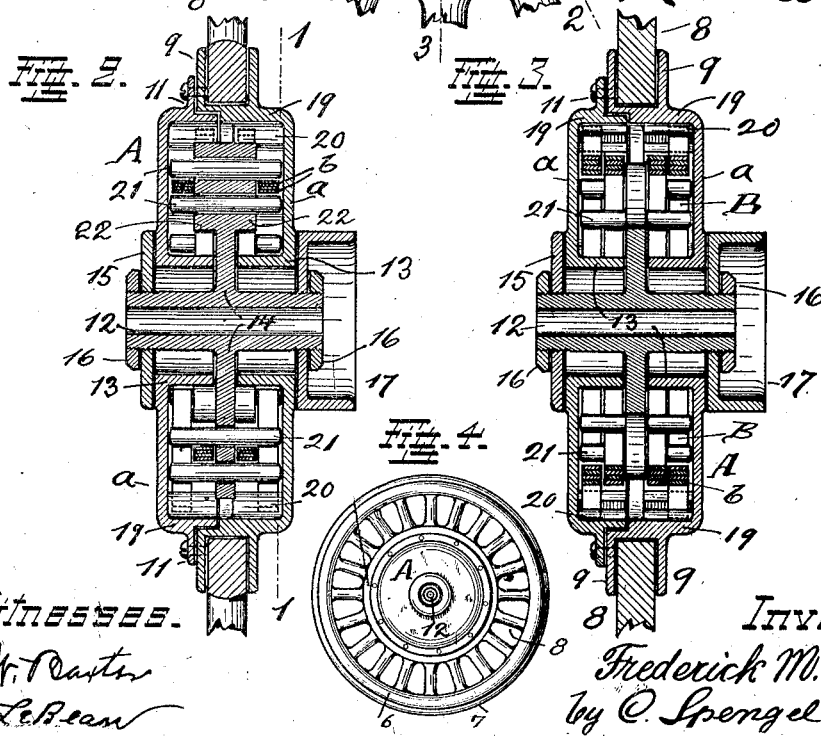

UNITED STATES PATENT OFFICE.

FREDERICK M. ROSS, OF OAKLEY, OHIO, ASSIGNOR OF ONE-HALF TO WILLARD W. BAXTER, OF NEWPORT, KENTUCKY.

RESILIENT WHEEL.

1,057,092. Specification of Letters Patent. Patented Mar. 25, 1913.

Application filed January 15, 1912. Serial No. 671,239.

*To all whom it may concern:*

Be it known that I, FREDERICK M. ROSS, a citizen of the United States, and a resident of Oakley, in the county of Hamilton and State of Ohio, have invented certain new and useful Improvements in Resilient Wheels; and I do declare the following to be a clear, full, and exact description of the invention, attention being called to the drawing which accompanies this application and forms a part thereof.

This invention relates to improvements in the construction of vehicle-wheels in which springs are used in place of pneumatic tires to produce the elasticity and cushioning effects to overcome vibrations of the axle and to neutralize the effects of jars upon the same when the wheel travels over rough and uneven ground.

The invention consists of the construction hereinafter described and claimed and illustrated in the accompanying drawing, in which—

Figure 1, shows a side-elevation of the wheel with parts broken away and with others shown in section, taken on a line indicated at 1—1 in Fig. 2. Fig. 2, is a cross-section taken on line 2—2 of Fig. 1. Fig. 3, is a similar section taken on line 3—3 of Fig. 1. Fig. 4, shows an elevation of the complete wheel at reduced scale.

In the drawing, numeral 6 indicates the rim of the wheel which may be covered by a usual solid rubber tire 7.

A is a ring-shaped, hollow spring-housing consisting for convenience of manufacture of two complementary sections *a—a*. This housing is rigidly connected to the rim, either directly, or by suitable intervenient means. As shown, spokes 8 are used for this purpose, seated at their outer ends in the inner side of the rim, and rigidly connected at their inner ends to the spring-housing. As shown, one of the housing-sections is provided with two spaced, annular flanges 9—9 which receive between them the inner ends of the spokes. Bolts 10 are used to complete the connection. The other housing-section has a flange 11 whereby it is connected to the housing-section first mentioned, which connection may be by means of screws.

12 is the hub axially perforated for reception of the axle-journal (not shown.) It occupies in normal position the center of the space surrounded by housing A, it being spaced from the inner side of said housing which surrounds this space. This inner side is formed by the annular inner wall 13 of each housing-section, which inner walls are alined with their inner edges opposite each other. These inner edges would meet except for a narrow annular space between them which is provided to clear an annular web which projects from the outside of the hub between the ends thereof and extends edgewise into the spring-housing where it is shaped to form a number of arms 14, which project radially from its edge into the spring-housing where they terminate with a space opposite their ends. The space between the hub and the inner, annular side of the housing opposite this hub, is closed by washers 15, held in place by nuts 16, seated upon the ends of the hub, except in case where the wheel is provided with a brake-disk 17, in which case this latter may take the place of one of the washers. These washers, or a washer and a brake-disk, are closely held against the flat, parallel sides of the spring-housing, but without connection thereto, so that housing and hub may freely move with respect to each other in any direction in a plane at right angles to the axis of the wheel, the housing moving between these washers. Both are held in a normal position, with reference to each other and with the hub in the center of the open space in the center of the spring-housing, by a number of straight bar-springs B arranged in pairs, a pair to each one of arms 14, the engagement between these arms and the springs being between the ends of these latter. At their ends these springs, each of which by preference is formed of a number of flat leaves *b*, are seated without attachment in sockets 18, provided around the inner side of the outer, annular walls 19—19, of each of the housing-sections. Each socket is formed by two spaced shoulders 20—20, which project from the inner side of said housing-walls. The two springs of a pair are parallel to each other and the engagement between their ends to arms 14, is between two pins 21, spaced opposite each other equal to the thickness of said springs and projecting from opposite sides of said arms in which they are seated. These pins may be loosely mounted, to reduce friction.

As will be seen, of the two springs of a pair, there is one on each side of the particular arm, one spring of the pair being in one housing-section and the other one in the other section, so that there is a spring to each arm in each housing-section and the end-portions of the springs on adjacent arms cross each other as shown. To permit this, the springs of the pairs on alternate arms are placed closely against the sides of their respective arms, while the springs of the intermediate pairs are placed outside of these other springs and closely against the flat sides of the housing-sections. Inasmuch as the springs in these latter pairs are farther apart than the ones placed closely against the arms, the arms which engage with these particular springs spaced farther apart may be increased in thickness between these springs by formation of a boss 22.

It will now be seen, that the outer, or rim-portion of the wheel and the hub are held to each other by an elastic connection which yieldingly breaks the effects of impacts which the rim may receive while traveling over the ground, the hub practically floating in a neutral position within the central space surrounded by the spring-housing. The free action of the springs is not interfered with, because they are not rigidly connected at any point, so that they may readily yield and bend in response to any action received against their ends from the spring-housing.

Having described my invention, I claim as new:

1. In a resilient wheel, the combination of an outer wheel-part embodying an annular spring-housing, springs parallel to each other and arranged in pairs endwise supported in the housing, a hub, and pins spaced opposite each other provided on the hub and engaging each pair of springs midway between their ends, a pin on each side of each spring.

2. In a resilient-wheel, the combination of a hub having radially extending arms, straight springs one on each side of each arm, pins spaced opposite each other projecting from each side of each arm whereby these springs are held in position midway between their ends on these arms, an outer wheel-part embodying a rim and means on this part engaging each spring, the engagement being at their ends but without attachment.

In testimony whereof, I hereunto affix my signature in the presence of two witnesses.

FREDERICK M. ROSS.

Witnesses:
 C. SPENGEL,
 WILLARD W. BAXTER.